United States Patent [19]

Hausdörfer et al.

[11] Patent Number: 4,496,966

[45] Date of Patent: Jan. 29, 1985

[54] METHOD FOR MIXING TWO COLOR TELEVISION SIGNALS

[75] Inventors: Michael Hausdörfer, Mühltal; Heinz Hess, Weiterstadt, both of Fed. Rep. of Germany

[73] Assignee: Robert Bosch GmbH, Stuttgart, Fed. Rep. of Germany

[21] Appl. No.: 437,888

[22] Filed: Oct. 29, 1982

[30] Foreign Application Priority Data

Nov. 4, 1981 [DE] Fed. Rep. of Germany ....... 3143653

[51] Int. Cl.³ ............................................. H04N 9/535
[52] U.S. Cl. ....................................................... 358/22
[58] Field of Search ...................................... 358/22, 26

[56] References Cited

U.S. PATENT DOCUMENTS 4,408,221 10/1983 McCoy .................................. 358/22

OTHER PUBLICATIONS

"High Quality Montage Pictures by a New Color Killer Soft Chromakey System", vol. 90, Feb. 1981, SMPTE Journal, pp. 107, 118.

Primary Examiner—Michael A. Masinick
Attorney, Agent, or Firm—Frishauf, Holtz, Goodman & Woodward

[57] ABSTRACT

The invention concerns a method and apparatus for mixing a foreground signal and a background signal under the control of a switching signal which is derived as a function of the color of the foreground signal. In response to the switching signal selected parts of the foreground signal are desaturated while maintaining their luminance component substantially unchanged; non-corresponding parts of the background signal are suppressed. Both signals so treated are additively superimposed. This leads to a better representation of fine details in the contours of a foreground object of interest.

8 Claims, 5 Drawing Figures

METHOD FOR MIXING TWO COLOR TELEVISION SIGNALS

This invention relates to a method and apparatus for mixing two colour television signals representative of foreground and background screw or object parts.

BACKGROUND

Methods are known in which switching between two colour television signals takes place as a function of the presence of a predetermined colour in one of the signals. This method is generally performed by directing a first (foreground) colour television camera onto a foreground object or objects of interest located against a monochromatic backdrop or backcloth, and replacing the portion of the foreground signal corresponding to the monochromatic backdrop by a substitute background signal produced by a second (background) colour television camera or other signal generator. Blue has proved most suitable for the monochromatic backdrop, so that this method is often called the blue screen method, although in principle any colour which is not in the foreground object of interest can be used as a switchover criterion.

If this switchover is performed with an electronic transfer switch, visually unnatural transitions often occur at the edges of the foreground object because fine details are not detected and optimization of the transitions with respect to both the luminance and chrominance information is not possible. This has led to the soft-key method in which a cross-fading process takes place between the signals of the foreground object and the substitute background.

The soft-key method may lead to colour fringing within the transition area between the signals. Another known method performs desaturation within this transition area with the foreground object signal being cross-faded into the substitute background signal (see SMPTE Journal, February 1981, pp. 107–118).

Nevertheless, this method can also lead to interference due to minor time errors of the two signals relative to one another or in the derivation of the switching or cross-fading signals. This interference becomes noticeable in the case of fine structures at the edges of the foreground object, for example on the hair or a female newsreader.

THE INVENTION

The object is to obviate the aforementioned difficulties in a method and apparatus for mixing two colour television signals.

According to the present invention there is provided a method for mixing two colour television signals comprising a foreground signal and a background signal, the method comprising deriving a switching signal as a function of the colour of the foreground signal, desaturating selected portions of the foreground signal as a function of the switching signal while maintaining the luminance component thereof substantially unaltered, suppressing portions of the background signal during the time the foreground signal is not desaturated, and adding the selectively desaturated foreground signal and the partially suppressed background signal.

The invention has the advantage that the luminance component of the foreground signal remains substantially unchanged during mixing, so that all the fine contours or details of the foreground object are retained in the mixed signal. It is a further advantage that shadows cast on the "blue" screen by the foreground object can, if desired, be transferred without additional measures to the mixed output signal.

It is particularly advantageous to carry out the desaturation of the foreground signal within the colour coder which is present anyway. This can be brought about either by a controllable amplifier for the chrominance signal or by deriving from the latter a signal which, with respect to amplitude is the same as the chrominance signal but which is phase-shifted by 180° (i.e. inverted), the latter signal being added to the non-inverted chrominance signal under control of the switching signal in such manner that the desired desaturation takes place. A further possibility of desaturation is provided by an amplitude control to zero, or by operating on the video frequency colour difference signals before modulation of the colour carrier. The provision of low-pass filters prior to modulation guarantees the system parameters (1.3 MHz/3 dB).

BRIEF DESCRIPTION OF THE DRAWINGS

Embodiments of the invention will now be described, by way of example only and without limitation on the scope of the invention, with reference to the accompanying drawings, wherein.

DESCRIPTION OF PREFERRED EMBODIMENTS

Figure 1:
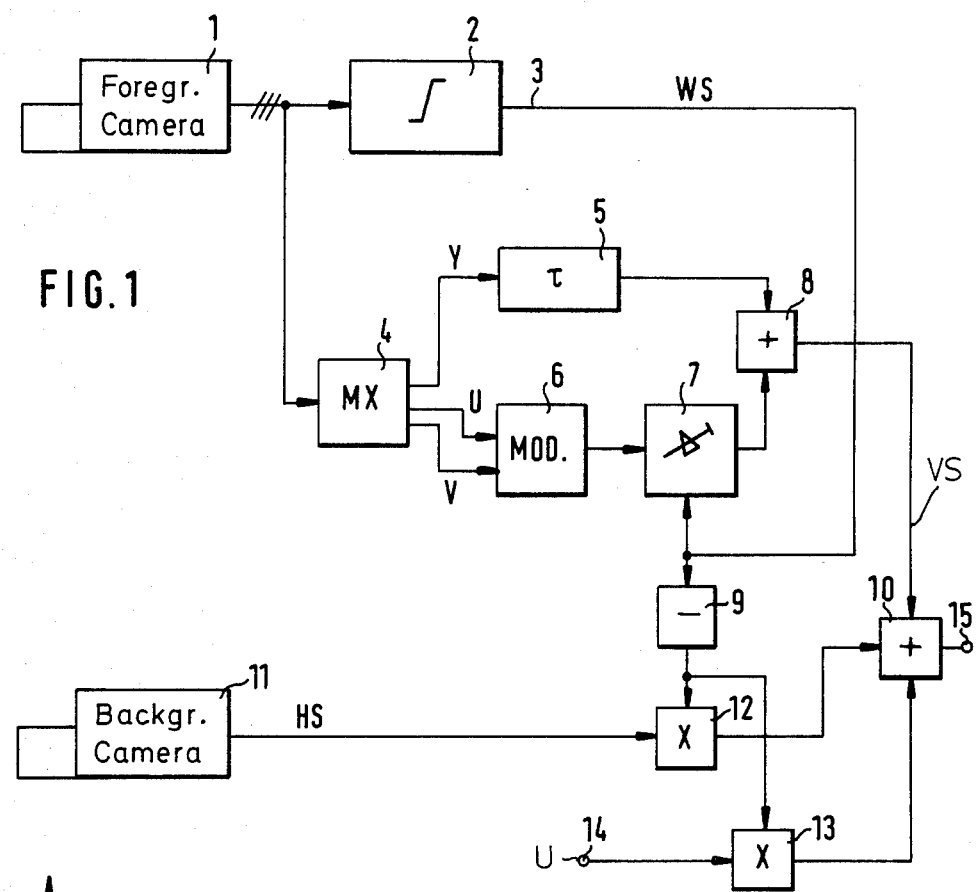
FIG. 1 is a block circuit diagram of an apparatus for performing the method according to the invention, FIG. 2 are voltage-time diagrams of signals occurring during operation of the apparatus of FIG. 1.

In the apparatus shown in FIG. 1, a foreground camera 1 is, for example, directed onto a newsreader positioned in front of a blue wall or screen. The colour signals R, G, B from the camera 1 are supplied to a switching signal generator 2. Such generators have been described in detail in the literature and do not need further explanation in the present context; sufficient to say that a switching signal is provided at the output 3 of the circuit 2 which assumes a first state in response to a preselectable foreground colour, in this example the blue of the screen or wall behind the newsreader, and a second state in response to other colours. This switching signal WS has relatively gradual transitions in order that, for the reasons mentioned hereinbefore, it causes no additional interference.

In conventional manner a luminance signal Y and colour difference signals U and V are derived from the colour signals R, G, B of the foreground camera 1 in a matrix 4, and the signals U and V are supplied to a modulator 6 for quadrature amplitude modulation of a chrominance carrier. The modulated chrominance carrier is supplied via a controllable amplifier 7 to an adder 8, where it is added to the luminance signal Y. A delay network 5 is provided in the luminance channel for equalising the delay times in the luminance and chrominance channels.

Figure 2:
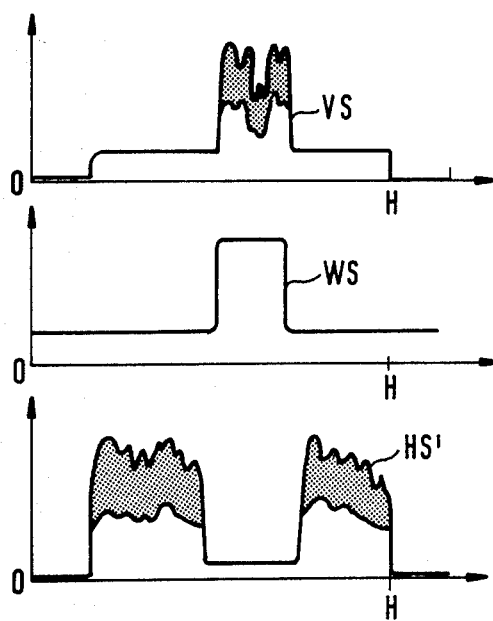

The circuit comprising elements 4, 5, 6 and 8 essentially represents a known PAL or NTSC coder. However, by means of the amplifier 7, which is controlled by the switching signal WS, the amplitude of the modulated chrominance carrier, i.e. the chrominance signal, is controlled in such a way that during the scanning of the blue wall or screen by the foreground camera 1 no chrominance signal reaches the adder 8. Thus, during this period, only the luminance component of the foreground signal is transmitted to the adder 8. Since colours with a high colour saturation and a low luminance factor in the red and green spectral range are typically used for the blue wall, and since the blue spectral range only contributes 11% to the luminance signal due to the standard matrixing, the luminance signal is small during this period compared with the total possible amplitude range. A typical signal VS produced in this manner from the adder 8 is shown in FIG. 2, graph a, over one line period H, from which it will be seen that only the chrominance signal but not the luminance signal is suppressed in respect of the blue regions of the foreground signal from the camera 1. The corresponding switching signal WS is shown in FIG. 2, graph b.

The substitute background signal which is to replace the blue signal portion of the foreground camera 1 is produced by a background camera 11 or other picture signal generator, for example a slide scanner, a film scanner or video recording equipment. In the example of FIG. 1, the background camera 11 supplies a background signal HS in the form of a colour television signal coded according to the PAL or NTSC standard. The switching signal WS undergoes polarity reversal in an inverting circuit 9 and is supplied together with the background signal HS to a multiplier 12. As a result, during scanning of the foreground object of interest by the foreground camera 1, the background signal HS is suppressed. The resulting signal HS' (FIG. 2, graph c) and the foreground signal VS (FIG. 2, graph a) are supplied to an adder 10, at whose output 15 the desired superimposition of both signals is available.

As stated hereinbefore, the luminance portion of the foreground signal from camera 1 undergoes no switching or cross-fading process, so that all the picture details present in the luminance signal are reproduced in the mixed signal in a manner true to the original. However, this means that the portion of the luminance signal in VS corresponding to the blue wall or screen is superimposed on the substitute background signal HS' leading to a reduction of contrast. In order to prevent this, the inverted switching signal WS is supplied also to a second multiplier 13 provided with an adjustable d.c. voltage U as input via a terminal 14. This d.c. voltage is added to the mixed signals at the adder 10 and is adjusted as regards magnitude and polarity to compensate for the reduced contrast provided by the signal VS in the substitute background signal HS', it being effective only during the period of the substitute background signal HS' by virtue of the inverted switching signal WS controlling the multiplier 13. Alternatively, for the same purpose the foreground signal VS (FIG. 2, graph a) may be inverted and supplied to terminal 14, so that the amplitude required for correction is automatically obtained. In such case it is advantageous for the inverted foreground signal VS to undergo low-pass filtering before being supplied to multiplier 13, so that short pulses are not used for correction. Due to the uniformity of the blue wall screen, such short pulses can only be formed by picture details, which are not to be suppressed, are present outside the switching signal WS in the foreground signal VS.

Figure 3:
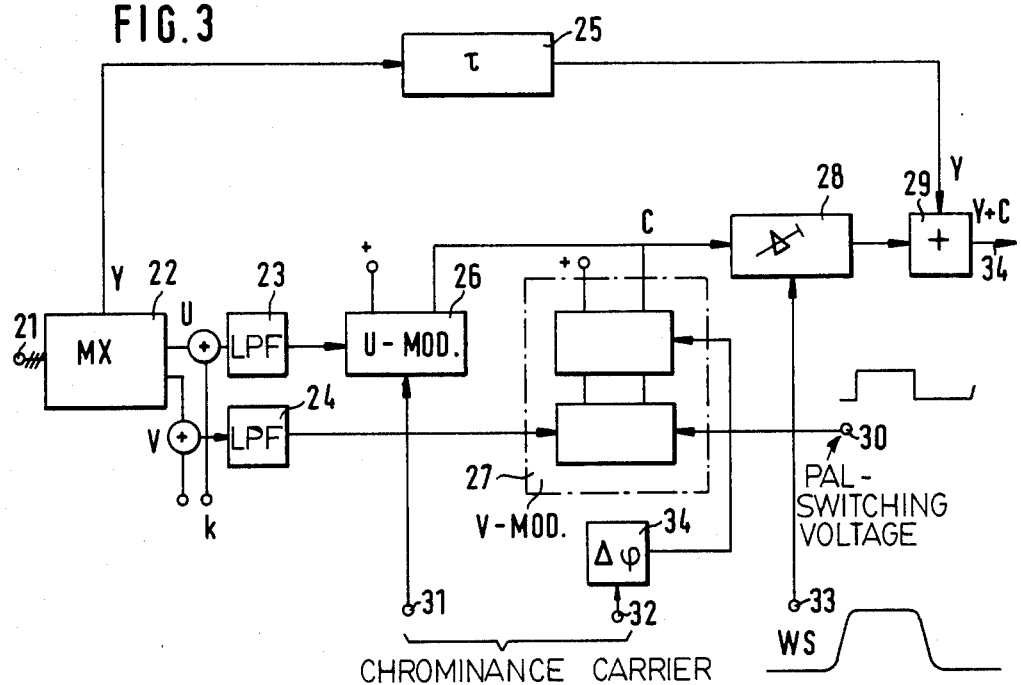
FIG. 3 is an embodiment of a foreground signal desaturation arrangement for use in the apparatus of FIG. 1.

FIG. 3 shows in somewhat more detailed form a coder which may be used in the apparatus of FIG. 1. At 21 the colour signals R, G, B from the foreground camera 1 are fed to a matrix 22, at whose outputs are available the luminance signal Y and the two colour difference signals U and V. Each of the colour difference signals U and V is supplied via a respective low-pass filter 23, 24 to a respective modulator 26, 27. The chrominance carrier is supplied to these modulators via input terminals 31, 32. The coder shown is for use in respect of the PAL colour television standard, in which the chrominance carrier supplied at 32 is phase-shifted by 90° in a phase shifter 34. In addition, a PAL switching voltage of half the line frequency is supplied to the modulator 27 via input terminal 30. The outputs of modulators 26, 27 are jointly connected to the input of a controllable amplifier 28, which is controlled by the switching signal WS supplied at 33 to suppress the chrominance signal outside the foreground object of interest; i.e. in respect of the blue screen signal portion of the foreground camera. An adder 29 corresponds to the adder 8 of FIG. 1 and is used for adding in the luminance signal Y suitably delayed by the delay network 25. The complete PAL colour television signal with luminance and chrominance components Y and C respectively is thus present at output 34.

Figure 4:
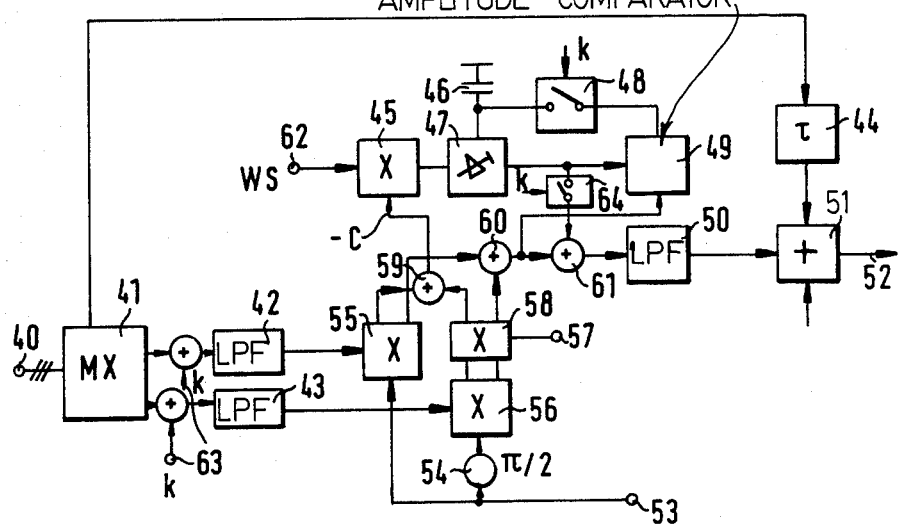
FIG. 4 is a second embodiment of a foreground signal desaturation arrangement.

To avoid impairment of quality, the foreground signal VS should be disturbed as little as possible. For this purpose FIG. 4 shows a coder circuit in which the chrominance signal follows a main path which is not directly influenced by the switching signal, the direct selective suppression of the chrominance signal by the switching signal being performed in a secondary path. In the circuit of FIG. 4 the colour signals R, G, B are once again supplied to a matrix 41 via input 40 and, as in the case of the circuit of FIG. 3, are supplied across low-pass filters 42, 43 to modulators which comprise multipliers 55, 58, 56 and a phase shifter 54. The chrominance carrier is supplied at 53 and a PAL switching pulse with half the line frequency is supplied at 57. The chrominance signal is formed at the output of adder 60 and is fed to a summing circuit 51 via a further adder 61 and a low-pass filter 50 which is used for suppressing the higher frequency components formed during modulation. By means of this summing circuit 51 the chrominance signal is added to the luminance signal Y suitably delayed by the delay network 44. The colour television signal is available at output 52.

The switching signal WS (in inverted form) is supplied to an input 62 of a multiplier 45 to whose other input is supplied the inverted chrominance signal −C derived by adding the inverted output signals from the multipliers 55 and 58 in an adder 59. The output of the multiplier 45 is therefore that portion of the inverted chrominance signal corresponding to the blue wall or screen in the foreground signal from the camera 1, and this may be used to suppress the corresponding component in the non-inverted chrominance signal by simple addition in an adder 61. For complete suppression of the non-inverted chrominance signal during the scanning of the blue wall by the foreground camera 1 it is necessary not only to maintain the phase position of the inverted chrominance signal, i.e. the opposite polarity, but the amplitude of the inverted chrominance signal supplied to adder 61 must correspond in magnitude to that of the non-inverted chrominance signal. For this purpose the output signal of the adder 60 is supplied to an amplitude comparator 49 and compared with the amplitude of the signal supplied to the adder 61. The result of the comparison is written as an analog voltage into a storage capacitor 46 during the occurrence of each colour burst, and for this purpose a switch 48 is temporarily closed by the burst flag k. The stored charge voltage of the storage capacitor 46 controls a controllable amplifier 47 in such manner as to maintain the amplitude of the inverted chrominance signal at the same magnitude as that of the non-inverted chrominance signal. Since it is necessary that the inverted signal −C does not eliminate the colour burst in the non-inverted signal, a switch 64 is inserted between the amplifier 47 and the adder 61, the switch being temporarily opened by the burst flag k. The colour burst flag k is initially inserted into the U and V signals at 63 immediately prior to the low-pass filters 42 and 43.

Figure 5:
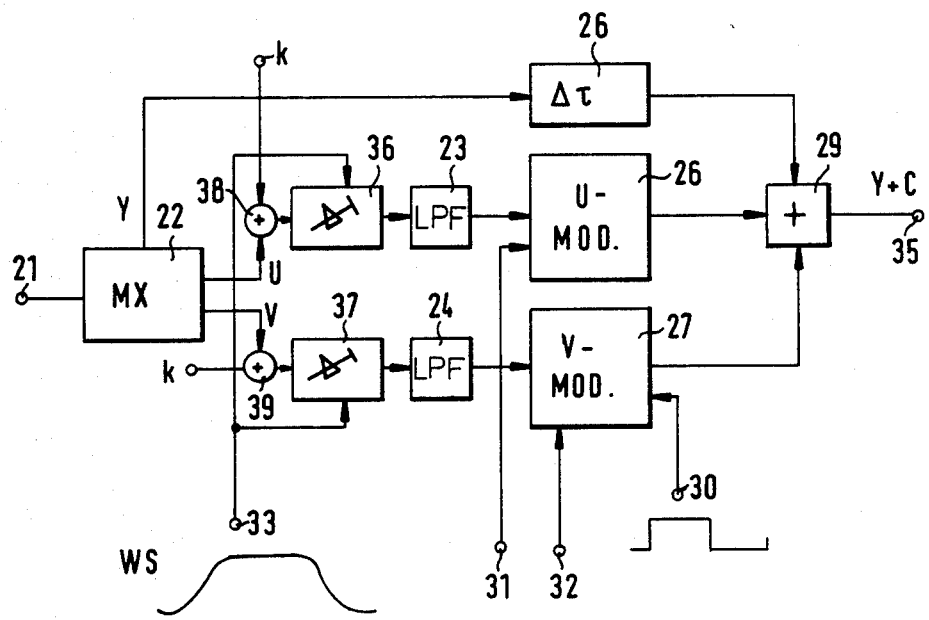
FIG. 5 is a third embodiment of a foreground signal desaturation arrangement.

FIG. 5 shows a circuit arrangement in which the colour desaturation is performed prior to modulation by the U and V signals. As most of the components of the circuit of FIG. 5 correspond to those of the circuit of FIG. 3, reference will only be made hereinafter to the differences between the two circuits. Whereas in the arrangement of FIG. 3 a controllable amplifier 28 is connected in the path of the modulated chrominance carrier, in the arrangement of FIG. 5 the amplitude of the colour difference signals is influenced by the switching signal WS supplied at 33, each colour difference signal having a respective controllable amplifier 36, 37. In the simplest case, the controllable amplifiers 36, 37 can comprise electronic switches which switch out the colour difference signals in respect of the blue wall or screen. The following low-pass filters 23, 24 limit the possible excessively steep switching edges to a rise time compatible with the colour television standard. Prior to the controllable amplifiers 36, 37 a burst flag is added to the colour difference signals by means of summing circuits 38, 39 and this gives the colour burst at the output of the modulators. By correspondingly adding the burst flag to the switching signal WS it is ensured that the controllable amplifiers 36, 37 are transmissive during this time so that the colour burst is not suppressed in the output signal at 35. A similar technique may be used in the FIG. 3 arrangement.

It is to be understood that whereas in the above embodiments the switching signal WS is derived directly from the R, G, B colour signals from the foreground camera 1, such signal could alternatively be derived from the colour difference signals U and V, or from the chrominance signal itself, e.g. immediately after the modulator 6 in FIG. 1.

It is further to be understood that the partial suppression of the background signal as hereinbefore described, and its addition to the selectively desaturated foreground signal, need not occur in the vicinity of the cameras or coder. For example, the selectively desaturated foreground signal may be supplied by the coder to a remote location together with the corresponding switching signal having the same time delay. At the remote location these signals may be supplied to an external mixing device such as a vision mixer where the foreground signal and a locally or otherwise produced background signal are added together, the switching signal serving to effect the desired partial suppression of the background signal at the vision mixer.

We claim:
1. Method for mixing two colour television signals comprising a foreground signal sensed by a foreground camera and a background signal, comprising
deriving a switching signal (WS) as a function of the colour of the foreground signal by providing a first switching signal when the colour of the foreground sensed by the foreground camera differs from a selected background colour and a second signal when the colour sensed by the foreground camera is effectively only that of said selected background colour;
desaturating selected portions of the foreground signal while maintaining the luminance component thereof substantially unaltered during occurrence of said second switching signal;
at least partially suppressing portions of the background signal during occurrence of the first switching signal;
and adding the selectively desaturated foreground signal and the partially suppressed background signal.

2. Method according to claim 1, further including the step of adding a further signal to the selectively desaturated portion of the foreground signal, said further signal being of opposite polarity and substantially equal magnitude as that of the foreground signal.

3. Method according to claim 1, wherein the foreground signal is passed through a controllable amplifier (7) in a chrominance channel, including the step of
controlling said controllable amplifier (7) by the switching signals to effect said selective desaturation of the foreground signal.

4. Method according to claim 1, wherein the foreground signal is passed through a controllable amplifier (7) in the chrominance channel;
and including the step of adding the output of said controllable amplifier and the unaltered luminance component of the foreground signal to obtain a composite, selectively partially desaturated foreground signal;
and said adding step comprises adding said composite, selectively partially desaturated signal to the partially suppressed background signal.

5. Method according to claim 1, wherein said selected background colour is blue.

6. Apparatus for mixing two colour television signals comprising a foreground signal sensed by a foreground camera (1) and a background signal (HS) supplied by a background signal source (11), comprising
means (2) for deriving a switching signal as a function of the colour of the foreground signal, said switching signal comprising a signal having one characteristic when the colour sensed by said foreground camera differs from a selected background colour, and a signal having a second characteristic when the colour sensed by the foreground camera is the same as the background colour;
means (7) for desaturating selected portions of the foreground signal when said switching signal has said second switching signal characteristic, while maintaining the luminance component of said foreground signal substantially unaltered;
means (9,12) for suppressing portions of the background signal during occurrence of the switching signal having said first characteristic;
and adder means (10) for adding the selectively desaturated foreground signal with the luminance signal unaltered, and the partially suppressed background signal, said adding means being connected to and receiving the signal from said suppression means and said desaturation means.

7. Apparatus according to claim 6, wherein the desaturation means comprises a controllable amplifier, connected to and controlled by said switching signal deriving means;
a luminance signal channel (Y;5) is provided;
and adder means (8) adding the output of said controllable amplifier and the signals in the luminance channel to add the luminance components of the colour television signal, unaltered, with the selectively desaturated portions of the foreground chrominance signal,
said adder (8) being connected to said adding means (10) for adding said selectively desaturated foreground signal and the unaltered luminance signal to the selectively, and partially suppressed background signal.

8. Apparatus according to claim 6, wherein said selected background colour is blue.

* * * * *